(12) United States Patent
Hikita et al.

(10) Patent No.: US 7,856,165 B2
(45) Date of Patent: Dec. 21, 2010

(54) OPTICAL WAVEGUIDE FILM AND MANUFACTURING METHOD THEREOF

(75) Inventors: Takami Hikita, Osaka (JP); Masayuki Hodono, Osaka (JP); Kunio Nagasaki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 169 days.

(21) Appl. No.: 12/222,036

(22) Filed: Jul. 31, 2008

(65) Prior Publication Data

US 2009/0067798 A1  Mar. 12, 2009

(30) Foreign Application Priority Data

Jul. 31, 2007  (JP) ............................. 2007-199994

(51) Int. Cl.
*G02B 6/10* (2006.01)
*G02F 1/1333* (2006.01)

(52) U.S. Cl. ...................................... 385/129; 349/122

(58) Field of Classification Search ................. 385/129; 349/122
See application file for complete search history.

(56) References Cited

U.S. PATENT DOCUMENTS

2005/0122455 A1* 6/2005 Watanabe et al. ........... 349/122
2006/0008225 A1* 1/2006 Naitou et al. ............... 385/129

FOREIGN PATENT DOCUMENTS

JP    2002-116334      4/2002
JP    2007-17521   *   1/2007

* cited by examiner

*Primary Examiner*—Charlie Peng
(74) *Attorney, Agent, or Firm*—Jean C. Edwards, Esq.; Akerman Senterfitt

(57) ABSTRACT

An optical waveguide film includes a film including a clad layer and a core layer covered by the clad layer; and an adhesive layer formed at least on one surface of the film, having a rough structured surface having an arithmetic mean surface roughness of 0.1 to 2.0 μm, and having a storage modulus at 25° C. of 10 to 100 MPa obtained by dynamic viscoelastic measurement in torsion mode with a frequency of 1 Hz.

5 Claims, 5 Drawing Sheets
(1 of 5 Drawing Sheet(s) Filed in Color)

1

(a)

(b)

(c)

(d)

(a)

(b)

(c)

(d)

(e)

(a)

(b)

OPTICAL WAVEGUIDE FILM AND MANUFACTURING METHOD THEREOF

CROSS REFERENCE TO RELATED APPLICATION

The present application claims priority from Japanese Patent Application No. 2007-199994 filed on Jul. 31, 2007, the content of which is hereby incorporated by reference in its entirety.

BACKGROUND OF THE INVENTION

1. Field of the Invention

The present invention relates to an optical waveguide film and a manufacturing method thereof.

2. Description of Related Art

Conventionally, optical waveguide films used to optically connect between a plurality of optical elements provided on an optical substrate are known. Such optical waveguide film needs to be precisely positioned to the optical substrate when arranged thereon in order to secure an optical path.

As the optical waveguide film, for example, there has been proposed an optical wiring film made of a plurality of optical wiring layers and formed on a silicon substrate via a curable adhesive layer (cf. for example, Japanese Unexamined Patent Publication No. 2002-116334). In this proposal, a liquid curable adhesive layer (not yet cured) is first coated onto an optical wiring film, the optical wiring film is then positioned to a silicon substrate via the liquid curable adhesive layer thus coated, and subsequently, a curable adhesive layer having a desired adhesive strength is formed by curing and the optical wiring film is fixed to the silicon substrate.

SUMMARY OF THE INVENTION

However, in Japanese Unexamined Patent Publication No. 2002-116334, when the optical wiring film is fixed to the silicon substrate, the liquid curable adhesive layer flows to a connecting portion between the optical wiring film and an optical element, which may block the optical path in the optical wiring layer.

On the other hand, use of a sheet-like adhesive layer having a high adhesive strength may eliminate the possibility of blocking the optical path because of less flowing of the adhesive layer. However, due to the higher initial adhesive strength of the adhesive layer, the optical waveguide film is fixed to the optical substrate immediately after the adhesive layer is brought into contact with the optical substrate. This immediate adhesion makes it difficult to adjust the arrangement of the optical waveguide film with respect to the optical substrate during positioning. As a result, the optical waveguide film is difficult to accurately position to the optical substrate.

An object of the present invention is to provide an optical waveguide film having high connection reliability, capable of ensuring easy peeling and excellent positioning accuracy during positioning and capable of reliably fixing a film after positioning, and a manufacturing method thereof.

The optical waveguide film of the present invention comprises a film comprising a clad layer and a core layer covered by the clad layer; and an adhesive layer formed at least on one surface of the film, having a rough structured surface having an arithmetic mean surface roughness of 0.1 to 2.0 μm, and having a storage modulus at 25° C. of 10 to 100 MPa obtained by dynamic viscoelastic measurement in torsion mode with a frequency of 1 Hz.

Further, in the optical waveguide film of the present invention, it is preferable that the adhesive layer is formed of acrylic adhesive composition.

Further, in the optical waveguide film of the present invention, it is preferable that the adhesive layer has a thickness of 10 μm or more.

Further, in the optical waveguide film of the present invention, it is preferable that an initial adhesive strength of the adhesive layer is 0.5 N/cm or less.

The method for manufacturing an optical waveguide film according to the present invention comprises the steps of preparing a casting plate having a rough structured surface having an arithmetic mean surface roughness of 0.1 to 2.0 μm; coating an adhesive composition onto a surface of the casting plate; curing the adhesive composition to form an adhesive layer having a storage modulus at 25° C. of 10 to 100 MPa obtained by dynamic viscoelastic measurement in torsion mode with a frequency of 1 Hz; preparing a film comprising a clad layer and a core layer covered by the clad layer; and adhesively bonding the clad layer to a surface opposite to the surface of the adhesive layer in contact with the casting plate.

According to the optical waveguide film of the present invention, when the optical waveguide film is initially adhered to an adherend, the rough structured surface of the adhesive layer having the specific surface roughness is brought into contact with the adherend, so that the initial adhesive strength can be reduced. This facilitates peeling during positioning, thereby ensuring excellent positioning accuracy.

Since the adhesive layer has the specific storage modulus, sufficient adhesive strength can be secured in adhesion to the adherend after the initial adhesion, so that the film can be securely fixed onto the adherend.

In addition to this, the specific storage modulus of the adhesive layer can suppress the flowage of the adhesive layer in the initial adhesion to the adherend, thereby preventing the adhesive layer from blocking the optical path in the core layer.

Therefore, during the positioning, adhesion and peeling of the film to/from the adherend are repeated to adjust the arrangement of the film to the adherend, so that the positioning can be achieved with excellent positioning accuracy. In addition, after the positioning, the film can be securely fixed to the adherend and, further, excellent connection reliability can be ensured.

The method for manufacturing an optical waveguide film according to the present invention comprises the steps of preparing a casting plate having a rough structured surface having a specific surface roughness, coating an adhesive composition onto a surface of the casting plate, and curing the adhesive composition to form an adhesive layer having a specific storage modulus. Therefore, this method allows accurate and easy formation of the adhesive layer having a rough structured surface with a specific surface roughness because the rough structure on the surface of the casting plate having a specific surface roughness is transferred onto the surface of the adhesive layer formed of the adhesive composition thus coated on the surface of the casting plate.

Further, since this method comprises the steps of bonding the clad layer to a surface opposite to the surface of the adhesive layer in contact with the casting plate, sufficient contact area between the clad layer and the adhesive layer can be secured, thereby reliably adhering the clad layer to the adhesive layer.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF PREFERRED EMBODIMENTS

Figure 1:
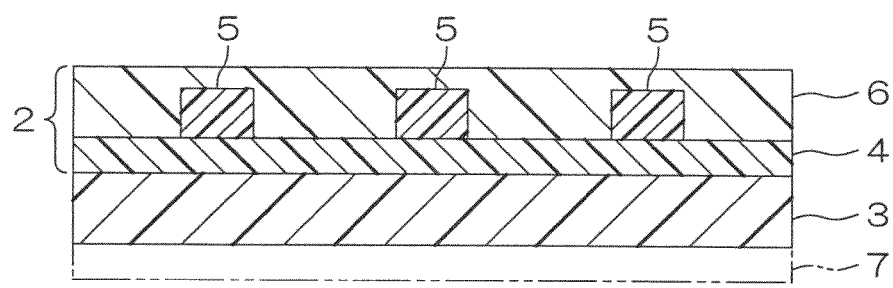
FIG. 1 is a sectional view along a widthwise direction illustrating one embodiment of an optical waveguide film according to the present invention.
Figure 2:
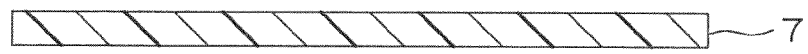
FIG. 2 is a process diagram illustrating the steps of manufacturing the optical waveguide film shown in FIG. 1, (a) showing the step of preparing a casting plate, (b) showing the step of coating an adhesive composition onto a surface of the casting plate, (c) showing the step of curing the adhesive composition to form an adhesive layer, and (d) showing the step of adhesively bonding an under clad layer and the upper surface of the adhesive layer.
Figure 2:
Figure 2:
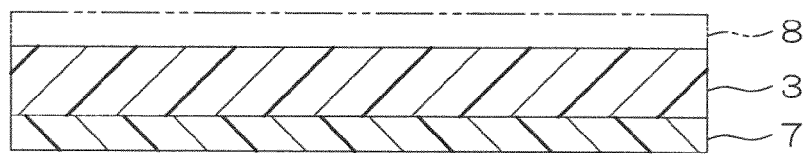
Figure 2:
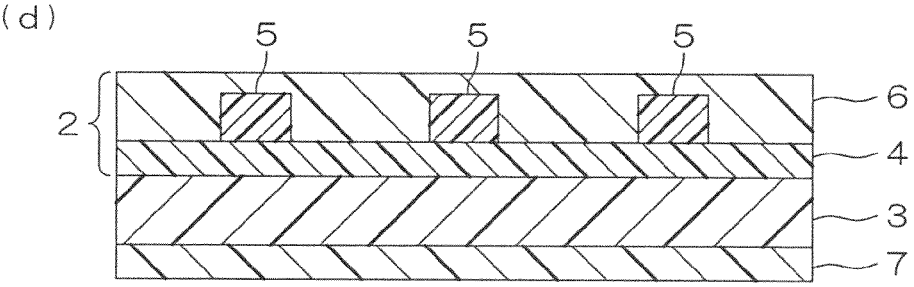
Figure 3:
FIG. 3 is a process diagram illustrating the steps of manufacturing a film of the optical waveguide film shown in FIG. 1, (a) showing the step of preparing a substrate, (b) showing the step of forming an under clad layer on the substrate, (c) showing the step of forming a core layer on the under clad layer, (d) showing the step of forming an over clad layer on the under clad layer so as to cover the core layer, and (e) showing the step of removing the substrate.
Figure 3:
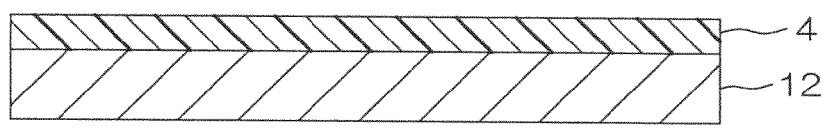
Figure 3:
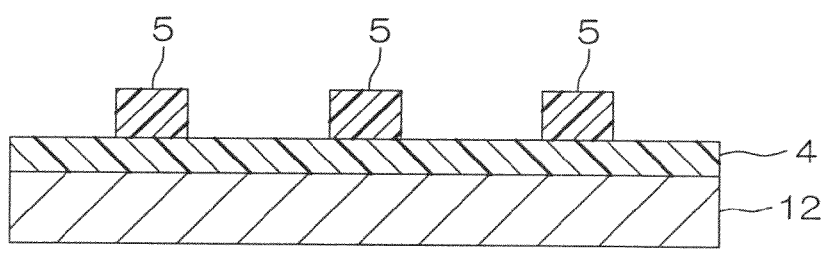
Figure 3:
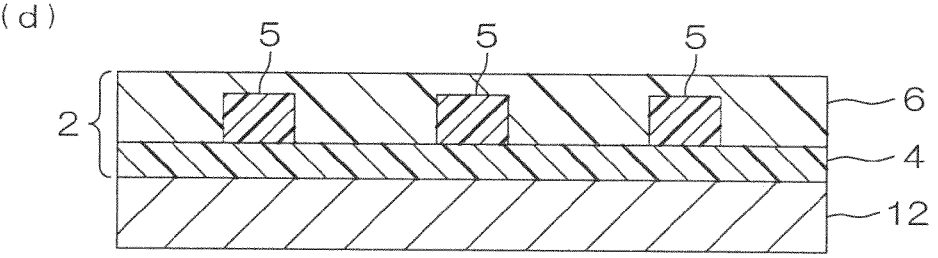
Figure 3:
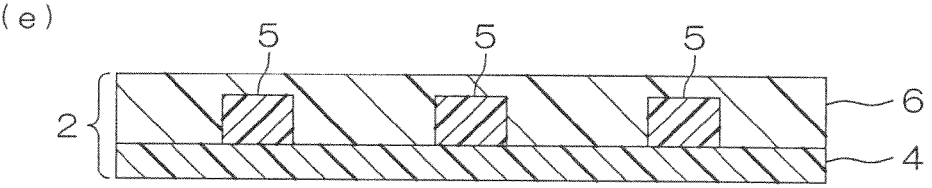
Figure 4:
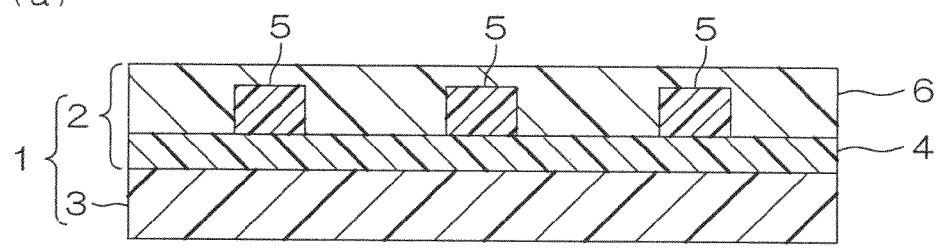
FIG. 4 is a sectional view for explaining a method of fixing the optical waveguide film shown in FIG. 1 to an optical substrate, (a) showing the step of removing a casting plate from an adhesive layer, and (b) showing the step of fixing an optical waveguide film to an optical substrate.
Figure 4:
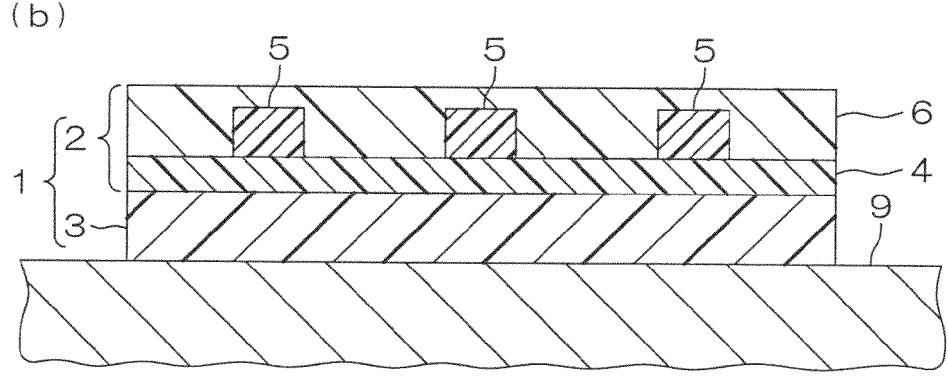

FIG. 1 is a sectional view along a widthwise direction (a direction perpendicular to a lengthwise direction) illustrating one embodiment of an optical waveguide film according to the present invention, FIG. 2 is a process diagram illustrating the steps of manufacturing the optical waveguide film shown in FIG. 1, FIG. 3 is a process diagram illustrating the steps of manufacturing a film of the optical waveguide film shown in FIG. 1, and FIG. 4 is a sectional view for explaining a method of fixing the optical waveguide film shown in FIG. 1 to an optical substrate.

In FIG. 1, the optical waveguide film 1 is formed in a band shape extending in the lengthwise direction, and includes a film 2 and an adhesive layer 3.

The film 2 is an optical waveguide, which is formed so as to correspond to the outer shape of the optical waveguide film 1. The film 2 includes an under clad layer 4 serving as a clad layer and an over clad layer 6, and a core layer 5 covered by the under clad layer 4 and the over clad layer 6. More specifically, the film 2 includes an under clad layer 4, a core layer 5 formed on the under clad layer 4, and an over clad layer 6 formed on the under clad layer 4 so as to cover the core layer 5.

A plurality (3) of the core layers 5 are provided on the upper surface of the under clad layer 4, extending in the lengthwise direction and arranged in parallel at spaced intervals to one another in the widthwise direction. Both lengthwise end portions of the core layer 5 serve as connecting portions to be optically connected with a plurality of optical elements. Each of the core layers 5 is formed in a generally rectangular shape in sectional view.

The adhesive layer 3 is provided on one surface of the film 2, more specifically, on the lower surface of the under clad layer 4.

The surface, that is, the lower surface of the adhesive layer 3 is formed in a rough structure, more specifically, in a rough structure having an arithmetic mean surface roughness of 0.1 to 2.0 µm. The lower surface of the adhesive layer 3 has an arithmetic mean surface roughness of preferably 0.1 to 0.5 µm, or more preferably 0.15 to 0.3 µm. The arithmetic mean surface roughness is determined as arithmetic mean Ra of the surface roughness obtained by the surface observation using a laser microscope. In addition, the arithmetic mean roughness is determined according to JIS B0601-1994.

The adhesive layer has a storage modulus at 25° C. of 10 to 100 MPa, preferably 10 to 70 MPa, or more preferably 10 to 30 MPa. The storage modulus at 25° C. is determined as torsion storage modulus G' at 25° C. obtained by dynamic viscoelastic measurement when the temperature is increased from −20° C. to 200° C. at a rate of 5° C./min in torsion mode with a frequency of 1 Hz.

On the other hand, the opposite surface of the adhesive layer 3, more specifically, the upper surface (surface to be in contact with the lower surface of the under clad layer 4) of the adhesive layer 3 is formed in a flat shape.

The optical waveguide film 1 also includes a casting plate 7 (described later) which covers a surface (lower surface) of the adhesive layer 3 as required, as indicated by phantom lines in FIG. 1.

Next, a method of manufacturing the optical waveguide film is described with reference to FIG. 2.

In this method, a casting plate 7 is first prepared, as shown in FIG. 2(a).

Examples of the material that may be used to form the casting plate 7 include ceramic materials such as silicon and glass; metallic materials such as copper, aluminum, stainless steel and iron alloy; and resin materials such as polyimide, glass-epoxy and polyethylene terephthalate (PET). From the viewpoint of ease of processing into a rough structure, a resin material is preferable, and PET is more preferable.

The surface of the casting plate 7, more specifically, the upper surface (surface to be in contact with an adhesive composition 13 which is subsequently coated) of the casting plate 7 is formed in a rough structure having an arithmetic mean surface roughness of 0.1 to 2.0 µm. The preferable range of the arithmetic mean surface roughness of the upper surface of the casting plate 7 is the same as that of the lower surface of the adhesive layer 3 as described above. The arithmetic mean surface roughness thereof is determined in the same manner as above.

The rough structure on the surface of the casting plate 7 can be formed by a known method such as embossing.

The casting plate 7 has a thickness of, for example, 10 to 5000 µm, or preferably 10 to 1500 µm.

Then, in this method, as shown in FIG. 2(b), the adhesive composition 13 is coated onto the surface of the casting plate 7.

The adhesive composition 13 does not substantially contain a solvent and forms the adhesive layer 3 by a curing method to be described later, and examples thereof include an acrylic adhesive composition. Such acrylic adhesive composition contains, for example, a monomer component or a partial polymer thereof, and an initiator.

The acrylic monomer component mainly contains alkyl (meth)acrylate, and also contains the other components such as reactive functional group-containing vinyl monomer having a reactive functional group and copolymerizable vinyl monomer which is copolymerizable with the above monomers (alkyl (meth)acrylate and reactive functional group-containing vinyl monomer).

The alkyl(meth)acrylate is alkyl methacrylate and/or alkyl acrylate, and examples thereof include alkyl (meth)acrylates (having linear or branched alkyl moiety having 1 to 3 carbon atoms) such as methyl(meth)acrylate, ethyl (meth)acrylate, propyl (meth)acrylate and isopropyl (meth)acrylate; alkyl (meth)acrylate (having linear or branched alkyl moiety having 4 to 18 carbon atoms) such as butyl (meth)acrylate, isobutyl (meth)acrylate, sec-butyl (meth)acrylate, t-butyl (meth) acrylate, pentyl (meth)acrylate, neopentyl (meth)acrylate, isopentyl (meth)acrylate, hexyl (meth)acrylate, heptyl (meth) acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth) acrylate, hexadecyl (meth)acrylate, heptadecyl (meth)acrylate, octadecyl (meth)acrylate (stearyl (meth)acrylate), isooctadecyl (meth)acrylate (isostearyl (meth)acrylate); and (meth)acrylic acid cycloalkyl esters such as cyclohexyl (meth)acrylate, cyclopentyl (meth)acrylate, bornyl (meth) acrylate and isobornyl (meth)acrylate. These alkyl(meth)acrylates can be used alone or in combination of two or more kinds.

The amount of the alkyl(meth)acrylate is, for example, from 50 to 99.5 parts by weight per 100 parts by weight of the monomer component.

Examples of the reactive functional group-containing vinyl monomer include carboxyl group-containing vinyl monomer, and examples of the carboxyl group-containing vinyl monomer include unsaturated carboxylic acids such as (meth)acrylic acid, fumaric acid, maleic acid, itaconic acid, crotonic acid and cinnamic acid; unsaturated dicarboxylic acid anhydrides such as fumaric anhydride, maleic anhydride and itaconic anhydride; unsaturated dicarboxylic acid monoesters such as monomethyl itaconate, monobutyl itaconate and 2-acryloyloxyethyl phthalate; unsaturated tricarboxylic acid monoesters such as 2-methacryloiloxyethyl trimellitate and 2-methacryloiloxyethyl pyromellitate; and carboxyalkyl acrylate such as carboxyethyl acrylate and carboxypentyl acrylate.

In addition to the above carboxyl group-containing vinyl monomers, examples of the reactive functional group-containing vinyl monomer include epoxy group-containing vinyl monomers such as glycidyl (meth)acrylate and methyl glycidyl (meth)acrylate; hydroxyl group-containing vinyl monomers such as 2-hydroxyethyl acrylate, 2-hydroxypropyl acrylate, 2-hydroxybutyl acrylate, ethylene glycol (meth)acrylate and propylene glycol (meth)acrylate; amide group-containing vinyl monomers such as (meth)acrylamide, N,N-dimethyl (meth)acrylamide, N,N-diethyl (meth)acrylamide, N-isopropyl (meth)acrylamide, N-butyl (meth)acrylamide, N-methoxymethyl (meth)acrylamide, N-methylol (meth) acrylamide, N-methylolpropane (meth)acrylamide and N-vinylcarboxylic acid amide; amino group-containing vinyl monomers such as dimethylaminoethyl (meth)acrylate and t-butylaminoethyl (meth)acrylate; cyano group-containing vinyl monomers such as acrylonitrile and methacrylonitrile; maleimide-based imide group-containing vinyl monomers such as N-cyclohexylmaleimide, N-isopropylmaleimide, N-laurylmaleimide and N-phenylmaleimide; itaconimide-based imide group-containing vinyl monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide-based imide group-containing vinyl monomers such as N-(meth)acryloyloxymethylenesuccinimide, N-(meth)acryloyl-6-oxyhexamethylenesuccinimide and N-(meth)acryloyl-8-oxyoctamethylenesuccinimide; sulfonic acid group-containing vinyl monomers such as styrenesulfonic acid, allylsulfonic acid, 2-(meth)acrylamide-2-methylpropanesulfonic acid, (meth)acrylamidepropanesulfonic acid, sulfopropyl (meth)acrylate and (meth)acryloyloxynaphthalenesulfonic acid; and isocyanate group-containing vinyl monomers such as 2-methacryloiloxyethyl isocyanate.

Among these reactive functional group-containing vinyl monomers, a carboxyl group-containing vinyl monomer is preferable.

The amount of the reactive functional group-containing vinyl monomer is, for example, from 0.5 to 15 parts by weight per 100 parts by weight of the monomer component.

Examples of the copolymerizable vinyl monomer include vinyl esters such as vinyl acetate and vinyl propionate; olefin-based monomers such as ethylene, propylene, isoprene, butadiene and isobutylene; aryl (meth)acrylates such as phenyl (meth)acrylate; aromatic vinyl monomers such as styrene and vinyltoluene; nitrogen atom-containing vinyl monomers such as (meth)acryloyl morpholine, aminoethyl (meth)acrylate, N,N-dimethylaminoethyl (meth)acrylate, and t-butylaminoethyl (meth)acrylate; alkoxy group-containing vinyl monomers such as methoxyethyl (meth)acrylate, ethoxyethyl (meth)acrylate, (meth)acrylic acid methoxyethylene glycol and (meth)acrylic acid methoxypolypropylene glycol; vinyl ether-based monomers such as vinyl ether; halogen atom-containing vinyl monomers such as vinyl chloride; vinyl group-containing heterocyclic compounds such as N-vinyl pyrrolidone, N-(1-methylvinyl) pyrrolidone, N-vinylpyridine, N-vinyl piperidone, N-vinylpyrimidine, N-vinylpiperazine, N-vinylpyrazine, N-vinylpyrrole, N-vinylimidazole, N-vinyloxazole, N-vinylmorpholine and tetrahydrofurfuryl (meth)acrylate; and acrylate ester-based monomers containing a halogen atom.

Examples of the copolymerizable vinyl monomer include polyfunctional monomer.

Examples of the polyfunctional monomer include (mono or poly)alkylene polyol poly(meth)acrylates such as ethylene glycol di(meth)acrylate, diethylene glycol di(meth)acrylate, triethylene glycol di(meth)acrylate, trimethylolpropane tri (meth)acrylate, tetraethylene glycol di(meth)acrylate, neopentyl glycol di(meth)acrylate, 1,6-hexanediol di(meth)acrylate, pentaerythritol di(meth)acrylate, tetramethylolmethane tri(meth)acrylate and dipentaerythritol hexa(meth)acrylate; and divinylbenzene. Examples of the polyfunctional monomer also include epoxy acrylate, polyester acrylate and urethane acrylate.

Among these copolymerization monomers, a polyfunctional monomer is preferable.

These copolymerizable vinyl monomers can be used alone or in combination of two or more kinds. The amount of the copolymerizable vinyl monomer is, for example, 49 parts by weight or less, per 100 parts by weight of the monomer component.

The partial polymer of the monomer component is a mixture of an unreacted monomer component and a polymer component, obtained by partially polymerizing (preliminarily polymerizing) a monomer component in the presence of an initiator. The polymerization rate of the partial polymer is, for example, from 2 to 40% by weight, or preferably from 5 to 20% by weight. The polymerization rate of the partial polymer can be calculated in the following process: About 0.5 g of a partial polymer is accurately weighed. After drying at 130° C. for 2 hours, the partial polymer is again accurately weighed to obtain the amount of weight loss (volatile amount (unreacted monomer weight)). The numerical value thus obtained is substituted into the following equation:

Polymerization Rate of Partial Polymer (%)=[1−(Amount of Weight Loss)/(Weight of Partial Polymer Before Drying)]×100

Examples of the initiator include photopolymerization initiator and thermal polymerization initiator. From the viewpoint of ease of curing, a photopolymerization initiator is preferable.

Examples of the photopolymerization initiator include benzoin ethers such as benzoin methyl ether, benzoin isopropyl ether and 2,2-dimethoxy-1,2-cdiphenylethan-1-one; substituted benzoin ethers such as anisole methyl ether; substituted acetophenones such as 2,2-diethoxy acetophenone, 2,2-dimethoxy-2-phenylacetophenone and 1-hydroxy-cyclohexyl-phenyl ketone; substituted alpha-ketols such as 2-methyl-2-hydroxy propiophenone; aromatic sulfonyl chlorides such as 2-naphthalenesulfonyl chloride; and photoactive oximes such as 1-phenyl-1,1-propanedione-2-(o-ethoxycarbonyl)-oxime. Preferable are 2,2-dimethoxy-1,2-cdiphenylethan-1-one and 1-hydroxy-cyclohexyl-phenyl ketone.

Commercially available products are usually used as the photopolymerization initiator, and examples thereof include IRGACURE series (manufactured by Ciba Specialty Chemicals Inc.), and specific examples thereof include IRGACURE 651 (2,2-dimethoxy-1,2-diphenylethan-1-one) and IRGACURE 184 (1-hydroxy-cyclohexyl-phenyl ketone).

These initiators can be used alone or in combination of two or more kinds. The amount of the initiator is, for example, from 0.01 to 5 parts by weight, or preferably from 0.1 to 3 parts by weight, per 100 parts by weight of the monomer component.

The adhesive composition 13 can be obtained by formulating and mixing the monomer component and the initiator both described above.

Further, additives, which are usually added to the adhesive composition, such as viscosity modifiers, and if necessary, crosslinking agents, release modifiers, plasticizers, softening agents, fillers, coloring agents (such as pigments and dyes) and antioxidants, can be added to the adhesive composition 13 at an appropriate ratio.

Examples of the viscosity modifier include styrene block polymer.

The adhesive composition 13 is coated by a coating method such as casting or spin coating.

The thickness of the adhesive composition 13 thus coated is appropriately selected according to the thickness of the adhesive layer 3 that is subsequently formed, and is, for example, 10 µm or more, or preferably 20 µm or more and is usually 400 µm or less.

Then, in this method, as shown in FIG. 2(c), the adhesive composition 13 is cured to form an adhesive layer 3.

The adhesive composition 13 is cured, for example, by light irradiation of the adhesive composition 13 when containing a photopolymerization initiator as an initiator, or by heating of the adhesive composition 13 when containing a thermal polymerization initiator as an initiator. Preferably, the adhesive composition 13 is cured by light (ultraviolet light) irradiation.

The ultraviolet light irradiation is performed, for example, at a dose of 400 to 4000 mJ/cm$^2$ with ultraviolet light having a wavelength of 300 to 400 nm whose irradiance is 1 to 200 mW/cm$^2$.

As indicated by phantom lines in FIG. 2(b), in the ultraviolet light irradiation, if necessary, a release film 8 made of synthetic resin such as PET is laminated on the surface (upper surface) of the adhesive composition 13 thus coated to block oxygen from the adhesive composition 13. The surface (lower surface) of the release film 8 is subjected to release treatment such as silicone treatment as required in order to improve releasability from the adhesive layer 3.

Thus, the adhesive composition 13 is cured to form an adhesive layer 3 having the above-mentioned storage modulus at 25° C. of 10 to 100 MPa.

The adhesive layer 3 thus formed has a thickness of, for example, 10 µm or more, or preferably 20 µm or more and is usually 400 µm or less.

Then, in this method, as shown in FIG. 3(e), a film 2 including the under clad layer 4, the core layer 5 and the over clad layer 6 is prepared.

To prepare the film 2, first, a substrate 12 is prepared as shown in FIG. 3(a). The substrate 12 has a plate shape, and examples of the material that may be used to form the substrate 12 include the same material as that used to form the casting plate 7 described above. From the viewpoint of ease of removal to be described later, a metallic material is preferable. The substrate 12 has a thickness of, for example, 10 to 5000 µm, or preferably 10 to 1500 µm.

Then, in this method, as shown in FIG. 3(b), an under clad layer 4 is formed on the substrate 12.

Examples of the material that may be used to form the under clad layer 4 include resin materials such as polyimide resin, polyamide resin, silicone resin, epoxy resin or fluorinated or deuterated resin obtained from any of these resins, and further fluorene derivative resin. Preferably, these resin materials are used in the form of photosensitive resins containing a photosensitizer. Preferable are a photosensitive polyimide resin (raw material: a photosensitive polyamic acid resin or a photosensitive fluorinated polyamic acid resin) and a photosensitive fluorene derivative resin (raw material: a photosensitive fluorene derivative).

To form the under clad layer 4 on the substrate 12, for example, a varnish (resin solution) of any of the above resins is prepared and then coated over the substrate 12 by a method such as casting or spin coating. Thereafter, the coated varnish is dried and then heated as required. In the case of using a photosensitive resin, after the coating and drying of the varnish, the coated varnish is exposed to light via a photomask and then heated as required. Thereafter, the heated varnish is developed and then heated.

The under clad layer 4 thus formed has a thickness of, for example, 5 to 100 µm.

Then, in this method, as shown in FIG. 3(c), a core layer 5 is formed on the under clad layer 4.

Examples of the material that may be used to form the core layer 5 include resin materials having a higher refractive index than the resin material used for the under clad layer 4.

Examples of the resin material include the same resin materials as those mentioned above.

To form the core layers 5, for example, a varnish (resin solution) of any of the above resins is prepared, and the varnish is coated onto a surface of the under clad layer 4. Thereafter, the coated varnish is dried to be cured as required. In the case of using a photosensitive resin, after the coating and drying of the varnish, the coated varnish is exposed to light via a photomask and then heated as required.

Each of the core layers 5 thus formed has a thickness of, for example, 5 to 100 μm and a width of, for example, 5 to 100 μm.

Then, in this method, as shown in FIG. 3(*d*), an over clad layer 6 is formed on the under clad layer 4 so as to cover the core layer 5.

The material that may be used to form the over clad layer 6 includes the same resin material as that used for the under clad layer 4. The under clad layer 4 and the over clad layer 6 can be formed of the same resin material or of different resin materials.

To form the over clad layer 6 on the under clad layer 4, for example, a varnish (resin solution) of any of the above resins is prepared and then coated over the under clad layer 4 including the core layer 5 by a method such as casting or spin coating. Thereafter, the coated varnish is dried and then heated as required. In the case of using a photosensitive resin, after the coating and drying of the varnish, the coated varnish is exposed to light via a photomask and then heated as required. Thereafter, the heated varnish is developed and then heated.

The over clad layer 6 thus formed has a thickness of, for example, 5 to 100 μm.

Thereafter, in this method, as shown in FIG. 3(*e*), the substrate 12 is removed. For example, etching or peeling is used to remove the substrate 12.

Thus, the film 2 including the under clad layer 4, the core layer 5 and the over clad layer 6 can be prepared.

Then, in this method, as shown in FIG. 2(*d*), the under clad layer 4 is adhesively bonded to a flat surface (a surface opposite to the surface in contact with the casting plate 7) of the adhesive layer 3.

More specifically, the lower surface of the under clad layer 4 in the film 2 is bonded to the upper surface of the adhesive layer 3 (the flat surface of the adhesive layer 3).

Therefore, the optical waveguide film 1 can be obtained.

In the optical waveguide film 1, the initial adhesive strength of the adhesive layer 3 to be described in detail in the following EXAMPLES is, for example, 0.5 N/cm or less, or preferably 0.2 N/cm or less and usually 0.1 N/cm or more while the adhesive strength after press-bonding of the adhesive layer 3 is, for example, 1 N/cm or more, or preferably 1.1 N/cm or more and usually 3 N/cm or less.

Next, a method for fixing the optical waveguide film 1 to the optical substrate 9 is described with reference to FIG. 4.

First, as shown in FIG. 4(*a*), the casting plate 7 (cf FIG. 2(*d*)) is removed from the adhesive layer 3 in the optical waveguide film 1 thus obtained. This exposes the lower surface of the adhesive layer 3 having a rough structure.

Thereafter, as shown in FIG. 4(*b*), the optical waveguide film 1 is fixed to the optical substrate 9 provided with an optical element (not shown).

In the fixation of the optical waveguide film 1 to the optical substrate 9, first, the lower surface of the adhesive layer 3 is once brought into contact (initial adhesion) with the upper surface of the optical substrate 9, while the optical waveguide film 1 is positioned to the optical substrate 9 from above so as to adjoin the optical element.

Then, when the optical waveguide film 1 is positioned to the optical substrate 9 so that the connecting portion of the core layer 5 is optically connected with the connecting portion of the optical element, the optical waveguide film 1 is fixed onto the optical substrate 9 by directly press-bonding the optical waveguide film 1 downward.

On the contrary, when the optical waveguide film 1 is not positioned to the optical substrate 9, the optical waveguide film 1 is pulled upward to remove the adhesive layer 3 from the optical substrate 9. Then, the optical waveguide film 1 is positioned (corrected its position) to the optical substrate 9, and the lower surface of the adhesive layer 3 is brought into contact with the upper surface of the optical substrate 9. Thereafter, when the optical waveguide film 1 is positioned to the optical substrate 9 so that the connecting portion of the core layer 5 is optically connected with the connecting portion of the optical element, the optical waveguide film 1 is fixed onto the optical substrate 9. When the optical waveguide film 1 is not positioned to the optical substrate 9, the peeling and the adhesion as described above are repeated.

In the method of manufacturing the optical waveguide film 1 as described above, the rough structure having the specific surface roughness on the upper surface of the casting plate 7 is transferred onto the lower surface of the adhesive layer 3 formed of the adhesive composition 13 that has been coated on the upper surface of the casting plate 7. This transfer allows accurate and easy formation of the adhesive layer 3 having a rough-structured lower surface with a specific surface roughness.

The method of manufacturing the optical waveguide film 1 can secure sufficient contact area between the under clad layer 4 and the adhesive layer 3, thereby reliably adhering the under clad layer 4 to the adhesive layer 3.

When the optical waveguide film 1 obtained by this method is initially adhered to the optical substrate 9, the initial adhesive strength can be reduced because the optical substrate 9 is brought into contact with the rough-structured lower surface of the adhesive layer 3 having a specific surface roughness. This facilitates peeling during positioning, thereby obtaining excellent positioning accuracy.

Further, since the adhesive layer 3 has a specific storage modulus, when it is adhered (press-bonded) to the optical substrate 9 after the initial adhesion, sufficient adhesive strength can be secured by press-bonding the rough-structured lower surface of the adhesive layer 3 having a specific surface roughness to the optical substrate 9, so that the film 2 can be securely fixed onto the optical substrate 9.

In addition to this, since the adhesive layer 3 has a specific storage modulus, the flowage of the adhesive layer 3 is suppressed in the initial adhesion to the optical substrate 9, thereby preventing the adhesive layer 3 from blocking the optical path between the connecting portion of the core layer 5 and the connecting portion of the optical element.

Therefore, during the positioning, adhesion and peeling of the film 2 to/from the optical substrate 9 are repeated to adjust the arrangement of the film 2 to the optical substrate 9, so that the positioning can be achieved with excellent positioning accuracy. In addition, after the positioning, the film 2 can be securely fixed to the optical substrate 9 and, further, excellent connection reliability can be ensured.

In the above explanation, the adhesive layer 3 was provided only on the lower surface of the under clad layer 4. However, the adhesive layer 3 can also be provided on the upper surface of the over clad layer 6.

EXAMPLE

The present invention will now be described in more detail by way of Examples and Comparative Examples. However, the present invention is not limited to the following Examples and Comparative Examples. In the following description, the units "part(s)" and "%" are by weight, unless otherwise noted.

Example 1

Preparation of Adhesive Composition

To a four-neck flask equipped with a condenser tube, a nitrogen introducing tube, a thermometer and a stirrer, 75 parts of isostearyl acrylate, 12 parts of acrylic acid, 0.1 parts of 1,6-hexanediol diacrylate, 0.2 parts of IRGACURE 651 (photopolymerization initiator, manufactured by Ciba Specialty Chemicals), 0.2 parts of IRGACURE 184 (photopolymerization initiator, manufactured by Ciba Specialty Chemicals) and 25 parts of styrene block polymer SEBS (viscosity modifier, manufactured by Sumitomo Chemical Co., Ltd.) were added and then mixed to prepare an adhesive composition.

Formation of Adhesive Layer

A PET film (EMBLET SM-38, thickness: 38 μm, size: 200×300 mm, manufactured by Unitika, Ltd.) subjected to processing (sand mat treatment) to form a rough structure on its upper surface was prepared (cf FIG. 2(a)). Subsequently, an adhesive composition was coated onto the upper surface of the PET film so as to have a thickness after curing of 40 μm (cf. FIG. 2(b)). Thereafter, the adhesive composition was adhesively bonded to a 35-μm-thick PET release film of which the lower surface was subjected to silicone treatment (release treatment) so that the adhesive composition was in contact with the lower surface of the release film, thereby blocking oxygen from the adhesive composition (cf. FIG. 2(b) (phantom lines)).

Next, ultraviolet light (wavelength: 315 to 400 nm) was irradiated thereto from the upper side of the release film with a black light (manufactured by Toshiba Corp.) at a irradiance of 3.6 mW/cm$^2$ for 5 minutes to cure the adhesive composition, thereby forming an adhesive layer sandwiched between the PET film and the release film (cf. FIG. 2(c)).

Production of Film

First, a substrate (200×300 in size) made of a 25 μm-thick stainless steel was prepared (cf. FIG. 3(a)). Then, a fluorene derivative varnish A was prepared according to the formulation shown in Table 1. The fluorene derivative varnish A thus prepared was coated onto a surface of the stainless steel substrate, and the coated varnish was heated at 100° C. for 15 minutes to dry. Thereafter, the dried varnish was exposed to light via a photomask and then developed. The developed varnish was heated at 100° C. for 20 minutes to be cured, thereby forming an under clad layer on the stainless steel substrate (cf. FIG. 3(b)). The under clad layer had a refractive index of 1.585 at a wavelength of 633 nm. The under clad layer had a thickness of 20 μm.

Further, a fluorene derivative varnish B was prepared according to the formulation shown in Table 1. The fluorene derivative varnish B thus prepared was coated onto a surface of the under clad layer, and the coated varnish was heated at 100° C. for 30 minutes to dry. Thereafter, the dried varnish was exposed to light via a photomask. After the exposure, the varnish was heated at 100° C. for 60 minutes and then developed. Subsequently, the developed varnish was heated at 100° C. for 10 minutes to be cured, thereby forming a core layer on the under clad layer. The core layer had a refractive index of 1.615 at a wavelength of 633 nm. The core layer had a thickness of 5 μm and a width of 5 μm.

The fluorene derivative varnish A was then coated onto a surface of the under clad layer containing the core layer, and the coated varnish was heated at 100° C. for 15 minutes to dry. Thereafter, the dried varnish was exposed to light via a photomask and then developed. The developed varnish was heated at 100° C. for 20 minutes to be cured, thereby forming an over clad layer on the under clad layer so as to cover the core layer (cf. FIG. 3(d)). The over clad layer had a refractive index of 1.585 at a wavelength of 633 nm. The over clad layer had a thickness of 20 μm Thereafter, the stainless steel substrate was removed by etching (cf. FIG. 3(e)).

Therefore, a film including the under clad layer, the core layer and the over clad layer was prepared.

TABLE 1

| Varnish | A | B (w/t part) |
|---|---|---|
| Fluorene Derivative-1 *1 | 83 | 67 |
| Fluorene Derivative-2 *2 | — | 33 |
| Diluent *3 | 17 | — |
| Photo-Acid Generator *4 | 1 | 1 |

*1: Bisphenoxyethanolfluorene diglycidyl ether
*2: Bisphenolfluorene diglycidyl ether
*3: 3,4-epoxycyclohexenylmethyl-3',4'-epoxycyclohexenecarboxylate (CELLOXIDE 2021P, manufactured by DAICEL CHEMICAL INDUSTRIES, LTD.)
*4: 50% propionic carbonate solution of 4,4-bis[di(β-hydroxyethoxy)phenylsulfinio] phenylsulfid-bis-hexafluoroantimonate Production of Optical Waveguide Film First, the release film was removed from the adhesive layer, and the lower surface of the under clad layer in the film was bonded to the upper surface of the adhesive layer (cf. FIG. 2(d)).

Thus, an optical waveguide film including the film and the adhesive layer was produced.

Example 2

In the same manner as in Example 1, except that the adhesive composition was coated so as to have a thickness after curing of 70 μm in the formation of the adhesive layer in Example 1, an adhesive layer was formed, and subsequently, an optical waveguide film was produced.

Example 3

In the same manner as in Example 1, except that the adhesive composition was coated so as to have a thickness after curing of 120 μm in the formation of the adhesive layer in Example 1, an adhesive layer was formed, and subsequently, an optical waveguide film was produced.

Example 4

Preparation of Adhesive Composition

To a four-neck flask equipped with a condenser tube, a nitrogen introducing tube, a thermometer and a stirrer, 45 parts of 2-ethylhexyl acrylate, 10 parts of acrylic acid, 45 parts of isobornyl acrylate, 0.1 parts of 1,6-hexanediol diacrylate, 0.05 parts of IRGACURE 651 (photopolymerization initiator, manufactured by Ciba Specialty Chemicals) and 0.05 parts of IRGACURE 184 (photopolymerization initiator, manufactured by Ciba Specialty Chemicals) were added and then mixed. While nitrogen gas was introduced into the flask, the mixture was irradiated with ultraviolet light to be preliminarily polymerized, thereby preparing an adhesive composition made of partial polymer (monomer syrup). The polymerization rate of the partial polymer was 8%.

Formation of Adhesive Layer and Production of Optical Waveguide Film

In the same manner as in Example 1, except that the adhesive composition prepared as described above, an adhesive layer (thickness: 40 μm) was formed, and subsequently, an optical waveguide film was produced.

Example 5

In the same manner as in Example 5, except that 15 parts of acrylic acid was used in place of 10 parts of acrylic acid in the preparation of the adhesive composition in Example 4, an adhesive composition containing a partial polymer was prepared, an adhesive layer (thickness: 40 μm) was then formed, and subsequently, an optical waveguide film was produced. The polymerization rate of the partial polymer was 8%.

Comparative Example 1

In the same manner as in Example 1, except that a normal PET film (PET film not processed into a rough structure) was used in place of the PET film processed into a rough structure in the formation of the adhesive layer in Example 1, an adhesive layer was formed, and subsequently, an optical waveguide film was produced.

Comparative Example 2

In the same manner as in Example 4, except that a normal PET film (PET film not processed into a rough structure) was used in place of the PET film processed into a rough structure in the formation of the adhesive layer in Example 4, an adhesive layer was formed, and subsequently, an optical waveguide film was produced.

Comparative Example 3

In the same manner as in Example 5, except that a normal PET film (PET film not processed into a rough structure) was used in place of the PET film processed into a rough structure in the formation of the adhesive layer in Example 5, an adhesive layer was formed, and subsequently, an optical waveguide film was produced.

Comparative Example 4

Preparation of Polymer Solution

To a four-neck flask equipped with a condenser tube, a nitrogen introducing tube, a thermometer and a stirrer, 100 parts of butyl acrylate, 1 part of acrylic acid, 0.3 parts of 4-hydroxybutyl acrylate, 0.1 parts of 2,2'-azobis(isobutyronitrile) and 200 parts of ethyl acetate were added, and nitrogen gas was introduced into the flask for 1 hour with gently stirring. Thereafter, while nitrogen gas was introduced thereinto, the mixture was polymerized for 10 hours with the solution temperature in the flask kept at 55 to 60° C., to prepare a polymer solution.

Preparation of Adhesive Solution

One part of a trimethylolpropane adduct of tolylene diisocyanate (Coronate L, manufactured by Nippon Polyurethane Industry Co., Ltd.) was added to 100 parts of the solid content of a polymer solution and then mixed with stirring, to prepare an adhesive solution.

Formation of Adhesive Layer

A PET film (EMBLET SM-38, thickness: 38 μm, manufactured by Unitika, Ltd.) having the upper surface subjected to processing (sand mat treatment) into a rough structure was prepared (cf. FIG. 2(a)). Subsequently, an adhesive solution was coated onto the upper surface of the PET film so as to have a thickness after drying of 40 μm (cf. FIG. 2(b)).

The PET film thus coated with the adhesive was then put into a dryer at 130° C. for 3 minutes to volatilize the residual monomers, thereby forming an adhesive layer (see FIG. 2(c)).

Production of Optical Waveguide Film

The lower surface of the under clad layer in the film was bonded to the upper surface of the adhesive layer (cf. FIG. 3(d)).

Thus, an optical waveguide film including the film and the adhesive layer was produced.

Evaluation

1) Storage Modulus (G')

As for the adhesive layers formed in Examples and Comparative Examples, a dynamic viscoelasticity measuring device (ARES, manufactured by TA instruments Co., Ltd.) was used to calculate a storage modulus at 25° C. by increasing the temperature from −20° C. to 200° C. at 5° C./min in torsion mode with a frequency of 1 Hz. The results are shown in Table 2.

2) Arithmetic Mean Surface Roughness (Ra)

The upper surface of the PET film processed into a rough structure and the lower surface of the adhesive layer formed according to each of Examples and Comparative Examples were subjected to surface observation using a laser microscope (1LM21H, manufactured by Lasertec Corporation) to determine the arithmetic mean surface roughness Ra. The arithmetic mean surface roughness Ra was calculated according to JIS B0601-1994.

The upper surface of the PET film processed into a rough structure had an arithmetic mean surface roughness Ra of 0.18 μm. Table 2 shows the arithmetic mean surface roughness Ra of the lower surface of the adhesive layer formed according to each of Examples and Comparative Examples.

Figure 5:
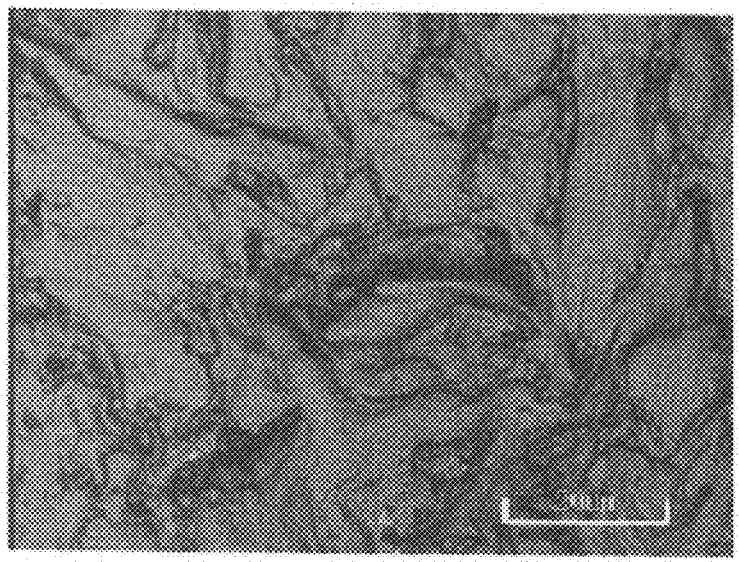
FIG. 5 is an image-processed picture (rear view) of the lower surface of an adhesive layer (in Example 1) by surface observation using a laser microscope.
Figure 6:
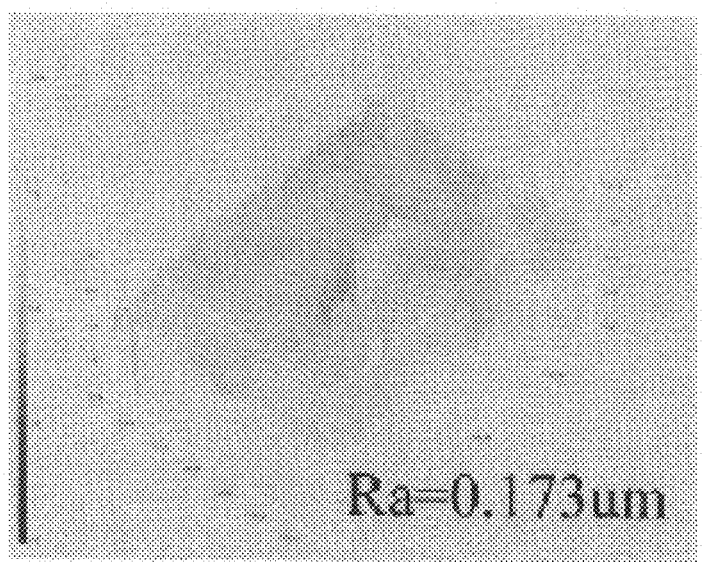
FIG. 6 is an image-processed picture (perspective view) of the lower surface of an adhesive layer (in Example 1) by surface observation using a laser microscope.

Image-processed pictures of the lower surface of the adhesive layer in Example 1 by surface observation using a laser microscope are shown in FIGS. 5 and 6. FIG. 5 is a rear view showing the lower surface of the adhesive layer, and FIG. 6 is a perspective view showing the lower surface of the adhesive layer.

3) Initial Adhesive Strength

The adhesive strength used when the adhesive layer of the optical waveguide film thus obtained was brought into contact with the optical substrate made of silicon with a pressure of 1 kPa was calculated as an initial adhesive strength. The results are shown in Table 2.

4) Adhesive Strength After Press-bonding (90° Peel Test)

The adhesive layer of the optical waveguide film thus obtained was bonded to the optical substrate made of silicon using a roll with a pressure of 400 kPa at a temperature of 130° C. After the optical waveguide film thus bonded was allowed to stand at 23° C. for 30 minutes, one end of the optical waveguide film was peeled off in a direction 90° relative to the optical substrate at a rate of 50 mm/min to measure the resistance (90° peel test). In the 90° peel test, the resistance was not measured until the optical waveguide film was peeled off to 10 mm from the end thereof When exceeding 10 mm, the measurement was started to determine the minimum resistance as an adhesive strength after press-bonding. The results are shown in Table 2.

TABLE 2

| Ex./Comp. Ex. | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Thickness of Adhesive Layer (μm) | 40 | 70 | 120 | 40 | 40 | 40 | 40 | 40 | 40 |
| Storate Modulus <25° C.> G' (MPa) | | 12.9 | | 16.9 | 68.0 | 12.9 | 16.9 | 68.0 | 0.10 |
| Arithmetic Mean Surface Roughness Ra (μm) | 0.17 | 0.18 | 0.17 | 0.17 | 0.17 | <0.05 | <0.05 | <0.05 | 0.15 |
| Initial Adhesive Strength (N/cm) | 0.12 | 0.10 | 0.15 | 0.11 | 0.10 | 0.7 | 0.8 | 0.6 | 1.0 |
| Adhesive Strenegth After Press-Bonding (N/cm) (90°Peel Test) | 1.57 | 1.03 | 1.42 | 1.10 | 1.09 | 0.83 | 1.14 | 1.20 | 2.50 |

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. An optical waveguide film comprising:
    a film comprising a clad layer and a core layer covered by the clad layer; and
    an adhesive layer formed at least on one surface of the film, having a rough structured surface having an arithmetic mean surface roughness of 0.1 to 2.0 μm, and having a storage modulus at 25° C. of 10 to 100 MPa obtained by dynamic viscoelastic measurement in torsion mode with a frequency of 1 Hz.

2. The optical waveguide film according to claim 1, wherein the adhesive layer is formed of acrylic adhesive composition.

3. The optical waveguide film according to claim 1, wherein the adhesive layer has a thickness of 10 μm or more.

4. The optical waveguide film according to claim 1, wherein an initial adhesive strength of the adhesive layer is 0.5 N/cm or less.

5. A method for manufacturing an optical waveguide film comprising the steps of:
    preparing a casting plate having a rough structured surface having an arithmetic mean surface roughness of 0.1 to 2.0 μm;
    coating an adhesive composition onto a surface of the casting plate;
    curing the adhesive composition to form an adhesive layer having a storage modulus at 25° C. of 10 to 100 MPa obtained by dynamic viscoelastic measurement in torsion mode with a frequency of 1 Hz;
    preparing a film comprising a clad layer and a core layer covered by the clad layer; and
    adhesively bonding the clad layer to a surface opposite to the surface of the adhesive layer in contact with the casting plate.

* * * * *